No. 756,079.

Patented March 29, 1904.

UNITED STATES PATENT OFFICE.

JOSEPH E. TICHON, OF NEW BEDFORD, MASSACHUSETTS, ASSIGNOR TO THEODORE E. PARKER, OF NEW BEDFORD, MASSACHUSETTS, AND HENRY F. STROUT AND J. COLBY BASSETT, OF BOSTON, MASSACHUSETTS, TRUSTEES.

PROCESS OF BRAZING CAST-IRON.

SPECIFICATION forming part of Letters Patent No. 756,079, dated March 29, 1904.

Application filed October 3, 1903. Serial No. 175,601. (No specimens.)

*To all whom it may concern:*

Be it known that I, JOSEPH E. TICHON, of New Bedford, in the county of Bristol and State of Massachusetts, have invented certain new and useful Improvements in Processes of Brazing Cast-Iron, of which the following is a specification.

This invention relates to processes of welding or brazing metals, and has for its object to provide a process for brazing cast-iron.

For the purpose of brazing two metallic parts the surfaces to be joined are cleaned in any suitable manner, as by dipping them in hydrofluoric acid. Then in following out my process I employ in one or more of the steps what is termed "boro-boracic acid" or "boro-borax." Generally I prefer to coat the surfaces to be joined with a paste containing boro-boracic acid, finely-divided wrought-iron filings, and water. The metallic parts are then placed and held in proper position and are heated to a red heat. After thus heating the parts spelter is poured over the joint. This spelter may consist of copper and zinc, with boro-boracic acid added thereto. The parts are then heated to a higher temperature, after which a dry flux of boro-boracic acid is poured over the joint and the parts are allowed to cool, this cooling being hastened by an air blast, if desired.

The boro-boracic acid is a powder which is the product of a mixture of sodium borate ($Na_2B_4O_7$) and boracic anhydrid ($B_2O_3$) in equal parts boiled in water until the water is evaporated. It melts at a higher temperature than borax and at a lower temperature than boracic acid and intumesces more quietly than either, thereby remaining in place upon the surfaces to be joined. By reason of the quietness of its intumescence it mixes better with the molten iron filings and spelter and more effectively absorbs the oxids formed, besides largely preventing the access of oxygen.

The paste of boro-boracic acid and iron filings is preferably used in a plastic condition, so that it will adhere to the surfaces to be brazed together.

I do not herein claim the welding or brazing compound having boro-boracic acid as an element thereof, nor the spelter containing that substance, as I claim the same in my copending application, Serial No. 175,602, filed October 3, 1903.

What I claim is—

1. The herein-described process of brazing metals, comprising applying boro-boracic acid, and spelter thereto in connection with fusing heat.

2. The herein-described process of brazing metals which includes coating the surfaces of the parts to be joined with a plastic paste of boro-boracic acid and metallic filings, heating the parts, and pouring spelter on the joint.

3. The herein-described process of brazing metals which includes coating the surfaces of the parts to be joined with a suitable paste having metallic filings, heating the parts, and pouring on the joint spelter and boro-boracic acid.

4. The herein-described process of brazing metals, which includes coating the surfaces to be joined with a paste consisting of metallic filings and boro-boracic acid, and heating the parts and the paste.

5. The herein-described process of brazing metals, which includes coating the surfaces of the parts to be joined with a paste containing boro-boracic acid, heating the said parts, putting spelter on the joint, heating the parts to a higher temperature, and placing on the joint dry boro-boracic acid.

In testimony whereof I have affixed my signature in presence of two witnesses.

JOSEPH E. TICHON.

Witnesses:
 MARCUS B. MAY,
 C. C. STECHER.